US012658440B2

(12) United States Patent
Schletter

(10) Patent No.: US 12,658,440 B2
(45) Date of Patent: Jun. 16, 2026

(54) NANOPARTICULATE SILICON CARBIDE AND ELECTRODE COMPRISING NANOPARTICULATE SILICON CARBIDE

(71) Applicant: Ludwig Schletter, Haag in Oberbayern (DE)

(72) Inventor: Ludwig Schletter, Haag in Oberbayern (DE)

( * ) Notice: Subject to any disclaimer, the term of this patent is extended or adjusted under 35 U.S.C. 154(b) by 804 days.

(21) Appl. No.: 17/426,382

(22) PCT Filed: Jan. 28, 2020

(86) PCT No.: PCT/EP2020/052065
§ 371 (c)(1),
(2) Date: Jul. 28, 2021

(87) PCT Pub. No.: WO2020/157079
PCT Pub. Date: Aug. 6, 2020

(65) Prior Publication Data
US 2022/0255077 A1     Aug. 11, 2022

(30) Foreign Application Priority Data

Jan. 28, 2019    (DE) .......................... 102019102083.2

(51) Int. Cl.
*H01M 4/58* (2010.01)
*C01B 32/977* (2017.01)
(Continued)

(52) U.S. Cl.
CPC ............. *H01M 4/58* (2013.01); *C01B 32/977* (2017.08); *C01P 2002/52* (2013.01);
(Continued)

(58) Field of Classification Search
CPC .. H01M 4/58; H01M 10/0525; H01M 10/052; H01M 2004/021;
(Continued)

(56) References Cited

U.S. PATENT DOCUMENTS 6,475,162 B1    11/2002 Hu
2003/0073899 A1    4/2003 Ruohonen et al.
(Continued)

FOREIGN PATENT DOCUMENTS

AU        2006252068        1/2007
CN        107001052 A        8/2017
(Continued)

OTHER PUBLICATIONS

NPL—New Laboratory Spectra of Isolated B—SiC Nanoparticles; D Clement; received Feb. 17, 2003; accepted May 12, 2003 (Year: 2003).*
(Continued)

*Primary Examiner* — Adam J Francis
(74) *Attorney, Agent, or Firm* — King IP Law; Joshua King

(57)    ABSTRACT
The present invention relates to nanoparticulate stoichiometric doped or non-doped silicon carbide SiC in the form of secondary particles, which consist of agglomerates of SiC primary particles, wherein the primary particles have a particle size in the range of 40-100 nm and the secondary particles have an average size of 1-10 μm. Furthermore, the present invention relates to an anode of a secondary lithium-ion battery containing the SiC according to the invention and a secondary lithium-ion battery having this anode.

18 Claims, 2 Drawing Sheets

Figure 1:
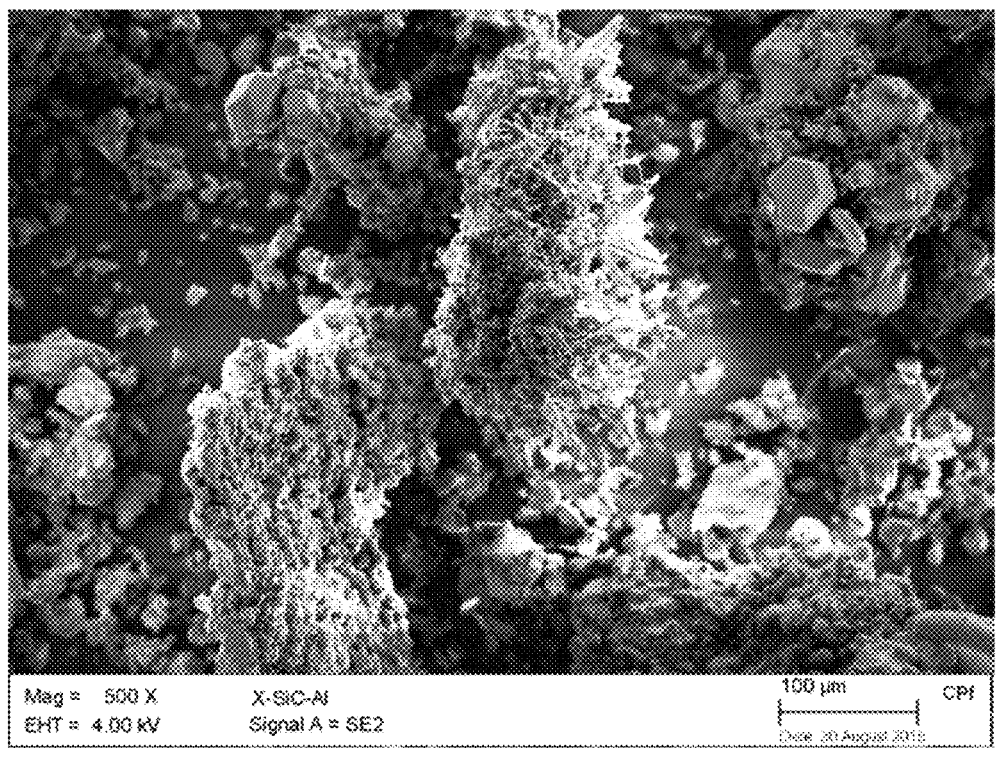

(51) Int. Cl.
 *H01M 4/02* (2006.01)
 *H01M 10/0525* (2010.01)
(52) U.S. Cl.
 CPC ...... *C01P 2002/72* (2013.01); *C01P 2004/03* (2013.01); *C01P 2004/50* (2013.01); *C01P 2004/61* (2013.01); *C01P 2004/64* (2013.01); *C01P 2006/40* (2013.01); *H01M 2004/021* (2013.01); *H01M 2004/027* (2013.01); *H01M 10/0525* (2013.01)
(58) Field of Classification Search
 CPC ........... H01M 2004/027; C01B 32/977; C01B 32/956; C01P 2002/52; C01P 2002/72; C01P 2002/54; C01P 2004/03; C01P 2004/50; C01P 2004/61; C01P 2004/64; C01P 2006/40; C01P 2006/10; C01P 2006/11
 See application file for complete search history.

(56) References Cited

U.S. PATENT DOCUMENTS

| | | | |
|---|---|---|---|
| 2010/0209328 A1 | 8/2010 | Bi et al. | |
| 2012/0129052 A1* | 5/2012 | Bauer ................... | H01M 4/364 |
| | | | 977/734 |
| 2014/0302396 A1* | 10/2014 | Lu ......................... | H01M 4/364 |
| | | | 205/57 |
| 2015/0291435 A1* | 10/2015 | Dhanaraj ............. | G04B 39/006 |
| | | | 428/80 |
| 2017/0338481 A1* | 11/2017 | Greulich-Weber .......................... | |
| | | | C04B 35/62834 |
| 2020/0009423 A1 | 1/2020 | Carita | |
| 2020/0216677 A1* | 7/2020 | Tsubota ................... | C09C 1/28 |
| 2020/0385625 A1* | 12/2020 | Lesniak ................ | C01B 21/068 |

FOREIGN PATENT DOCUMENTS

| | | |
|---|---|---|
| CN | 107346179 | 11/2017 |
| JP | 2000335913 A | 12/2000 |
| JP | 2013-071886 | 4/2013 |
| JP | 2018502420 | 1/2018 |
| KR | 20120039024 | 4/2012 |
| KR | 1020170084280 | 7/2017 |
| KR | 102674824 B1 | 6/2024 |

OTHER PUBLICATIONS

Clement, D. et al., "Laboratory Spectra of Isolated B—SiC Nanoparticles: Comparison with Spectra Taken by the Infared Space Observatory." The Astrophysical Journal, 594:642-650, Sep. 1, 2003.
Lomello, F. et al., "Processing of nano-SiC ceramics: Densification by SPS and mechanical characterization." Journal of the European Ceramic Society, 32:633-641, 2012.
Rufino, B., et al., "The effecft of particle size on the formation and structure of carbide-derived carbon on B—SiC nanoparticles by reaction with chlorine." Carbon 45:3073-3083, 2011.
International Search Report relating to International Patent Application No. PCT/EP2020-052065, mailed Apr. 17, 2020, 12 pages.
Korean Office action dated Sep. 12, 2023, relating to Korean Patent Application No. 10-2021-7026210, 3 pages.
English Language translation of Korean Office Action dated Sep. 12, 2023, relating to Korean Patent Application No. 10-2021-7026210, 3 pages.
D. Clement et al, New Laboratory Spectra of isolated [beta]-SiC Nanoparticles: Comparison with Spectra Taken by the Infrared Space Observatory, Astrophysical Journal, Sep. 1, 2003, vol. 594, No. 1, p. 642-650.
F. Lomello et al, Processing of nano-SiC ceramics: Densification by SPS and mechanical characterization, Journal of the European Ceramic Society, Mar. 1, 2012, vol. 32, No. 3, p. 633-641.
Japanese Office Action dated Mar. 28, 2025, relating to co-pending Japanese Patent Application No. 2024-062042, 6 pages.
Office Action dated May 27, 2025 relating to Korean Patent Application No. 10-2024-7019067, 4 pages.

\* cited by examiner

NANOPARTICULATE SILICON CARBIDE AND ELECTRODE COMPRISING NANOPARTICULATE SILICON CARBIDE

The present invention relates to nanoparticulate silicon carbide, its use, and an electrode comprising nanoparticulate silicon carbide, and a secondary lithium-ion battery which has this electrode. Mixed doped or non-doped lithium metal oxides have gained significance as electrode materials in so-called "lithium-ion batteries". For example, lithium-ion rechargeable batteries, also called secondary lithium-ion batteries, are considered to be promising batteries for battery-operated motor vehicles and are presently already used in many vehicle types. Lithium-ion batteries are moreover used in, for example, power tools, computers, and mobile telephones. In particular the cathodes and electrolytes, but also the anodes, consist of lithium-containing materials.

For example, $LiMn_2O_4$ and $LiCoO_2$ are used as cathode materials. Goodenough et al. (U.S. Pat. No. 5,910,382) proposes doped or non-doped mixed lithium transition metal phosphates, in particular $LiFePO_4$, as the cathode material for lithium-ion batteries.

In the presently market-leading and already very high-performance lithium-ion batteries, the electrolyte is usually liquid and consists of organic solvents such as a carboxylic acid ester, e.g., ethylene carbonate (EC), dimethyl carbonate (DMC), diethyl carbonate (DEC) etc. and a lithium-containing conductive salt. In practice, generally lithium hexafluorophosphate $LiPF_6$ is generally used as the conductive salt.

In the case of solid electrolytes in secondary lithium-ion batteries, lithium salts are typically used. For example, in JP-A 1990-2-225310, lithium titanium phosphates are proposed as solid electrolytes. Depending on the structure and doping, lithium titanium phosphates have an increased lithium-ion conductivity and a low electrical conductivity.

Typically graphite or also, as mentioned above, lithium compounds, for example lithium titanates, are used as anode materials, in particular for large-volume batteries. Most recently, various modifications of SiC are also described in particular as a composite material with various carbon allotropes. SiC itself SiC is similar in the structure and the properties to diamond. One special feature of SiC is its polytypic nature: It exists in many different phases, which differ in the atomic structure thereof. In all previously known polytypes of SiC, each silicon atom is linked by covalent bonds to four carbon atoms and vice versa, they therefore have a tetrahedral structure.

The so-called cubic phase β-SiC (due to its abc layer sequence also called 3C) crystallizes in a sphalerite structure, which is related to that of diamond. The other polytypes (27 in total) have a hexagonal or rhombohedral (15R-SiC, 21R-SiC, etc.) structure, wherein the hexagonal types occur most frequently overall. The simplest hexagonal structure (also called α-SiC) is wurtzite-like and because of the ab layer sequence is also referred to as 2H. The polytypes 4H and 6H (layer sequence abcb and abcacb), are encountered more frequently and are most technologically significant, which represent a mixture of the pure hexagonal 2H polytype and the pure cubic polytype 3C and are frequently also referred to as alpha-SiC. One (4H) or two (6H) cubic layers are embedded here between two hexagonal layers. Cubic SiC theoretically has a stable Li intercalation structure, a high potential ($Li/Li^+>0.1$ V), and is chemically nearly inert and stable. In practice, however, it has been shown that so-called "bulk" SiC does not permit lithium-ion intercalation. This has previously been overcome by adding carbon allotropes.

Zheng et al. (Electrochimica Acta 52 (2007) 5863-5867) describe electrodes for lithium-ion batteries made of composite materials which contain elementary silicon and carbon.

JP 2008066128 describes a method for producing an electrode for a lithium-ion battery in which, starting from a polysilane and a carbon source, a composite material is created, which has silicon carbide on a carbon material. U.S. Pat. No. 8,734,674 B1 discloses a method by which the lithium-ion capacity of silicon carbide is to be improved by additional graphitization.

Kumar et al. (RCD Adv., 2013, 3, 15028-15034) furthermore describe using silicon carbide as a material for anodes for lithium-ion batteries, wherein 3C-SiC is created by chemical gas phase deposition. Lipson et al. (J. Phys. Chem. C2012, 116, 20949-20957) describe an improvement of the electrochemical lithiation capacity of silicon carbide by surface graphitization.

There are initial suggestions that in the case of nanocrystalline SiC, in particular in the form of whiskers or fibers, lithium-ion insertion is possible.

Thus, WO2016/078955 discloses SiC, which is not characterized in greater detail, in the form of particles or fibers as the anode material for a lithium-ion secondary battery, as does CN103137973A, which discloses non-stoichiometric 4H and 6H-SiC for this purpose.

The object of the present invention was therefore to provide nanoparticulate silicon carbide, using which electrodes and batteries improved over known SiC, in particular secondary lithium-ion batteries, can be produced.

This object is achieved by a nanoparticulate stoichiometric silicon carbide SiC in the form of secondary particles, which consists of agglomerates of SiC primary particles (primary crystallites), wherein the primary particles have a particle size in the range of 5-100 nm and the secondary particles have an average size of 1-15 μm.

The size range of the primary particles is preferably in the range of 10-100 nm, more preferably in the range of 40-100 nm. This is typically the range which is obtained by the selected sol-gel method (see below) without further screening or grinding steps, so that this range offers economic advantages in the production. The smaller particle sizes, which do offer advantages in the further processing, are only accessible by additional grinding steps and represent a desirable but not particularly preferred embodiment for the above-mentioned reasons. If the primary particles are larger than 100 nm, the secondary particles also become too large to be able to be applied uniformly in suspension to the electrode film without damaging it. In addition, from this size the capability of the particles for lithium-ion intercalation decreases significantly in an order of magnitude up to 50%.

The agglomerates typically have a bulk density of 1200-1600 g/l (1.2-1.6 $g/cm^3$) and a compressed density of 1500-3000 g/l (1.5-3 $g/cm^3$). These unexpectedly high values enable improved, in particular automated processing of the material according to the invention, because more material can be introduced into the devices than with a material of lower bulk density and compressed density and in the case of the latter value, the amount of active material per electrode (electrode active mass density) and thus the energy density of the electrode, therefore the capacitance of the battery, can be increased. The $D_{90}$ value of the secondary particles is typically 8-10 μm depending on the batch. For efficient electrode manufacturing upon use of the material according to the invention as the active material, the secondary particles are to be ≤2 μm in size, but not larger than 15 μm. The silicon carbide according to the invention advantageously has a powder resistance <28 Ω/cm, particularly preferably ≤10 Ω/cm.

In preferred refinements of the invention, the nanoparticulate silicon carbide SiC according to the invention is present in the 3C crystal structure. This advantageously results in a slightly elevated thermal conductivity in comparison to other structure types, which can be advantageous for the thermal management of a battery, and also chemical and thermal durability, which is advantageous for long-term stability and high cycle stability. However, in other embodiments of the invention, further crystal structures, such as 6H-SiC or 4H-SiC or 15R-SiC can also be present as the single phase or as mixtures thereof and also polymorphous or polycrystalline SiC variants.

In further embodiments, the silicon carbide according to the invention is doped using at least one element, selected from Mg, Nb, Zr, B, Cr, V, Sc, Y, Al, N, P, La, Er, and Ga and mixtures thereof. The element is preferably selected from N and/or P for a so-called n-doping or from B and/or Al for a so-called p-doping. The doping enables further increased stability and cycle resistance of the silicon carbide during use in an anode. In particular, this is achieved if the dopant metal ions are incorporated individually or a plurality (for example, SiC:Al/B) thereof in the lattice structure. The dopant metal ions are preferably contained in a quantity of 0.05 to 6 at % or 3.5 to 5.5 at %, typically 5 at %, in other embodiments 3.5-4.5 at % in relation to silicon. The dopant metal cations are incorporated as substitutions in the crystal lattice. The amount is selected depending on the dopant element, because this influences the crystal structure after the incorporation in the lattice, in particular in the case of atoms of elements which are larger than Si. Fundamentally, it can thus be stated that elements having a smaller atomic diameter than Si can be incorporated in larger quantities, for example 6 at % in relation to Si, elements having a larger atomic diameter than Al preferably in smaller quantities, for example 4.5 at % and less, for example as already mentioned above at 3.5-4.5 at %.

These elements can be used either in the form of the pure elements thereof, for example in the case of aluminum, or in the form of the acetates, acetyl acetonates, chlorides, nitrates, sulfates or phosphates (only for phosphor doping or mixed doping with phosphor as a dopant element) and borates only for boron doping or mixed doping with boron as a dopant element).

Very particularly preferably, the silicon carbide according to the invention is doped using B and/or Al (thus SiC:Al, SiC:B, SiC:Al/B) or N and/or P (thus SiC:N, SiC:P, SiC:N/P), i.e., it is n- or p-doped.

An n-doping can be carried out with nitrogen, for example, by adding nitric acid, ammonium chloride, potassium nitrate, or melamine, or in the case of phosphorus by adding phosphoric acid, potassium dihydrogen phosphate, or disodium hydrogen phosphate to the starting sol. A p-doping can be carried out with boron by adding, for example, disodium tetraborate, boron acetyl acetonate or with aluminum by adding aluminum powder, aluminum chloride, or aluminum acetyl acetonate. The nanoparticulate silicon carbide according to the invention is preferably used as an active material in an electrode for a secondary lithium-ion battery. Other possible uses are, for example, in photovoltaics and solar cells or in light-emitting diodes and semiconductor components.

The silicon carbide according to the invention is used in one embodiment as an active material for an electrode of a secondary lithium-ion battery. It can be both a cathode and also an anode. The electrode is preferably an anode in this case.

In further preferred refinements of the invention, the SiC of the anode is doped using N or Al. The electrode doped using Al has a plateau at 0.4 V+/−0.1 V versus Li in its voltage diagram. The presence of a so-called plateau is more advantageous than a strong voltage drop, since the latter also results in an excessively large voltage window of a cell consisting, for example, of an anode containing the material according to the invention and the typical cathodes such as NMC (lithium-nickel-manganese-cobalt oxide). The cell voltage is the difference between the electrochemical potential, which is typically measured against the Li reference. A lower voltage drop of the cell in turn has advantages in the application, since the electronics of the application then have to compensate for smaller voltage changes. A low potential as obtained in the present case of the material according to the invention result in a high cell voltage and thus higher energy density.

The electrode according to the invention furthermore contains a binder. Any binder known per se to a person skilled in the art can be used as the binder, for example polytetrafluorethylene (PTFE), polyvinylidene difluoride (PVDF), polyvinylidene difluoride-hexafluorpropylene copolymers (PVDF-HFP), ethylene-propylene-diene terpolymers (EPDM), tetrafluorethylene-hexafluorpropylene copolymers, polyethylene oxides (PEO), polyacrylonitriles, (PAN), polyacrylomethacrylates (PMMA), carboxymethylcelluloses (CMC), and the derivatives and mixtures thereof.

The electrode preferably has a proportion of active material of at least ≥50 wt. %, more preferably of ≥90 wt. %. Even at these high contents of active material in the electrode according to the invention, its functionality is not restricted.

Furthermore, the invention relates to a secondary lithium-ion battery which contains an anode according to the above-described embodiments, in particular in a further embodiment an anode which comprises a doped silicon carbide according to the invention.

Further features and advantages of the present invention result from the following examples of special embodiments of the invention, which are not to be understood as restrictive to the scope of the invention.

Furthermore, in the figures

FIG. 1: shows a SEM picture of SiC doped using aluminum: 3C-SiC:Al

Figure 2:
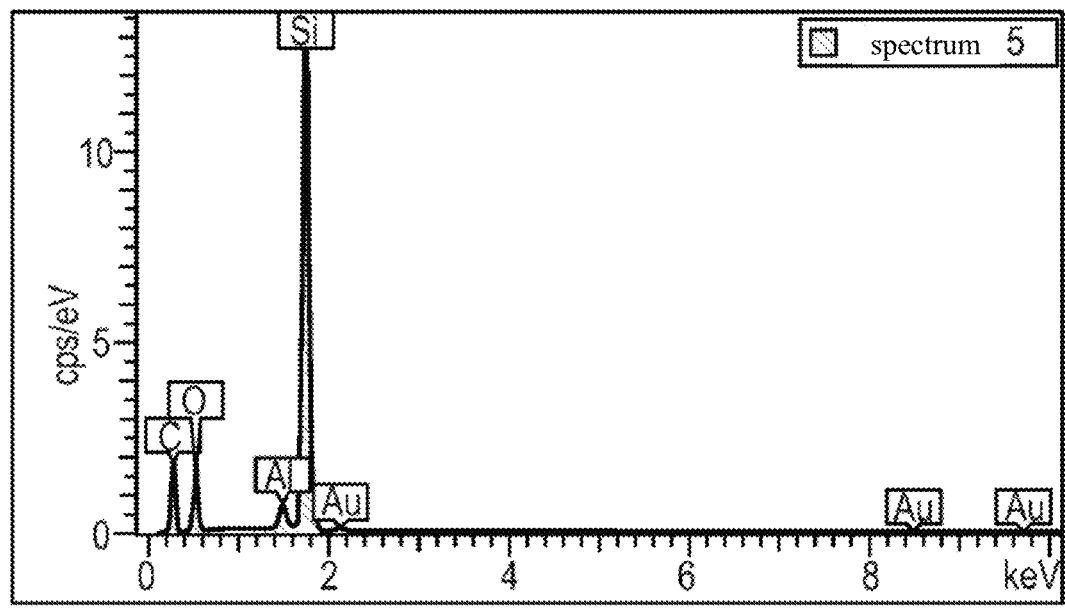

FIG. 2: shows the XRD spectrum of 3C-SiC:Al

Figure 3:
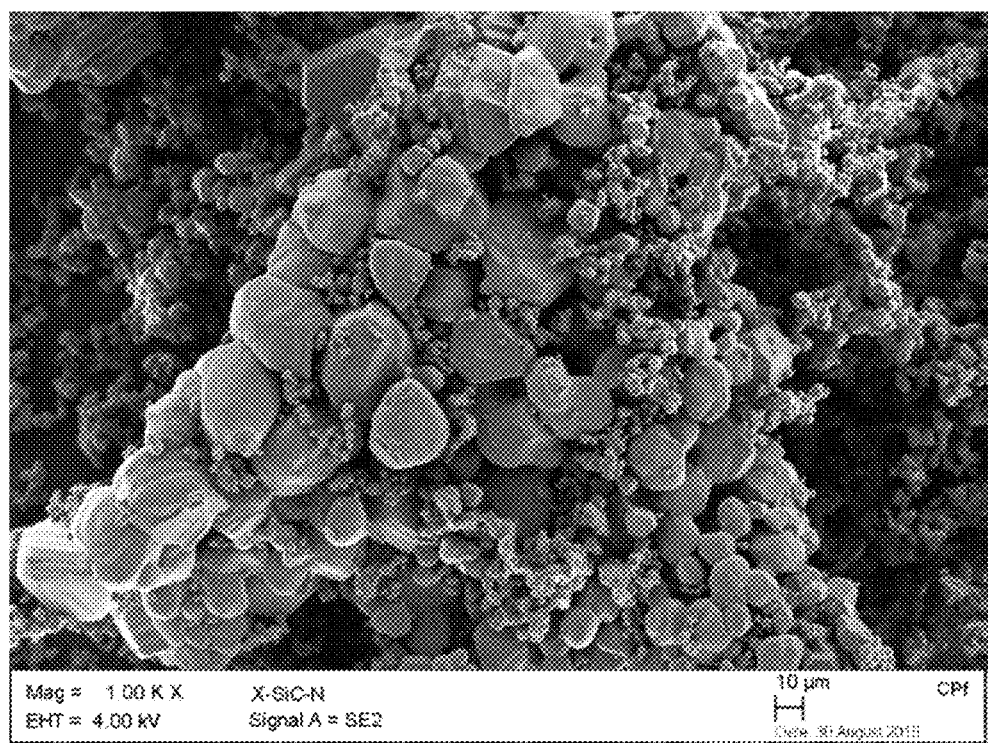

FIG. 3: shows a SEM picture of SiC doped using nitrogen: 3C-SiC:N

Figure 4:
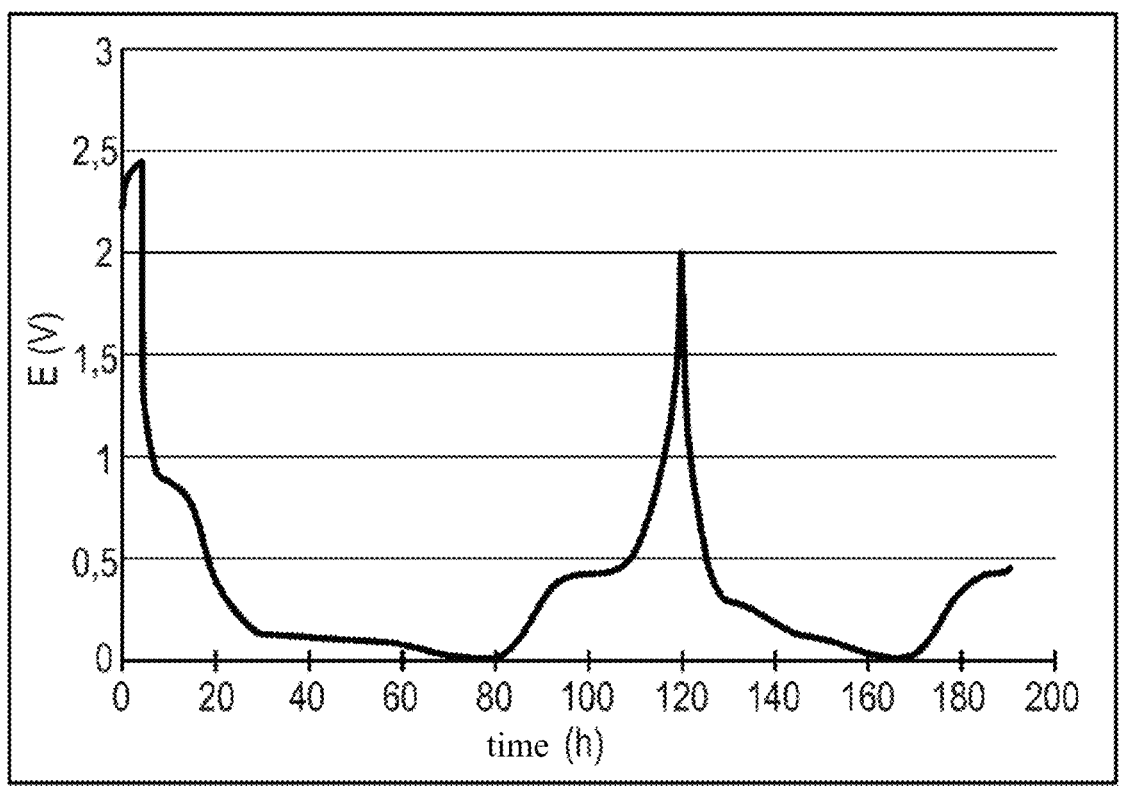

FIG. 4: shows a voltage diagram of an electrode according to the invention with 3C-SiC:Al vs. Li

EXEMPLARY EMBODIMENTS

Measurement Methods

The determination of the BET surface area was carried out according to DIN 66131 (DIN-ISO 9277). Micromeritics Gemini V or Micromeritics Gemini VII were used for this purpose as measuring devices.

The measurement of the x-ray powder diffractogram (XRD) was carried out using a Siemens XPERTSYSTEM PW3040/00 and the software DY784.

The SEM pictures were carried out using a LEO 1530 VP microscope, which was connected to a Gemini TFE column, at an acceleration voltage of 4 kV.

The determination of the compressed density and the powder resistance were carried out simultaneously on a Mitsubishi MCP-PD51 tablet press device with Loresta-GP MCP-T610 resistance measuring device, which were installed in a glovebox to which nitrogen was applied to preclude potential interfering effects of oxygen and moisture. The hydraulic actuation of the tablet press took place via a manual hydraulic press Enerpac PN80-APJ (max. 10,000 psi/700 bar).

The measurements were carried out at the following settings

| Sample quantity | | 4 g |
|---|---|---|
| Applied pressure | | 7.5 kN |
| Resistance meter | Loresta GP | Loresta GP |
| Measurement sensor setting | ESP | ESP |
| Poles | linear | linear |
| Pole interval | 3 mm | 3 mm |
| Pole size | 1.4 mm | 1.4 mm |
| Sample shape | round | round |
| Size of the sample | diameter = 20 mm | 20 mm |
| Thickness of the sample | sample dependent | 5 mm |
| Measurement position | X: 10 mm; Y: 10 mm | (10, 10) |
| RCF | automatic calculation | 2.758 |

The powder resistance was subsequently calculated according to the following equation:

$$\text{Powder resistance } [\Omega/\text{cm}] = \text{resistance } [\Omega] \times \text{thickness } [\text{cm}] \times \text{RCF}$$

The compressed density was calculated according to the following formula:

$$\text{Compressed density } (\text{g/cm}^3) = \frac{\text{mass of the sample (g)}}{\Pi \times r^2 (\text{cm}^2) \times \text{thickness of the sample (in cm)}}$$

Typical manufacturing tolerances are at most 3%.

Determination of the Density of the Active Material in an Electrode

To determine the material density of the active material, electrodes (thickness approximately 60 μm) having a composition 50% active material, 30 wt. % Super-P carbon, and 20 wt. % binder (NMP, N-methyl-2-pyrrolidone) were produced.

For this purpose, the appropriate quantities were weighed in a 50 ml screwtop jar and mixed for 5 minutes at 600 RPM on a magnetic stirrer using a crossbar stirring element, dispersed for 1 minute using an ultrasonic finger Hielscher UP200S, and subsequently after addition of 20 glass beads of the diameter 4 mm and closing of the glass, rotated at a speed of 10 RPM on a rolling table for at least 15 hours. For the electrode coating, the homogeneous suspension thus obtained was applied using a doctor blade laboratory squeegee having 200 μm gap width and a feed speed of 20 mm/sec on an aluminum carrier foil.

After drying at 80° C. in the vacuum drying cabinet, electrodes of 13 mm diameter were punched out of the film and mechanically post-compressed at room temperature on a uniaxial hydraulic laboratory press from Specac at a load of 10 tons for 60 seconds. For the density determination, the net electrode weight was determined from the gross weight and the known weight per unit of area of the carrier foil and the net electrode thickness was determined using a micrometer screw minus the known thickness of the carrier foil.

The active mass density in g/cm$^3$ in the electrode is calculated therefrom via $$\frac{(\text{Active material proportion in electrode formula}}{(50\%)*\text{electrode net weight in g}/(\pi((0.65} \\ \text{cm})^2*\text{net electrode thickness in cm})$$

As the value for the active material density in the electrode, 1.7 g/cm$^3$ was found for the material according to the invention.

Determination of the Particle Size Distribution:

The particle size distributions for the mixtures or suspensions and the produced material are determined on the basis of the light scattering method using commercially available devices. This method is known per se to a person skilled in the art, wherein reference is also made in particular to the disclosure in JP 2002-151082 and WO 02/083555. In the present case, the particle size distributions were determined according to DIN 66133 with the aid of a laser diffraction meter (Mastersizer S, Firma Malvern Instruments GmbH, Herrenberg, DE) and the software of the producer (Version 2.19) using a Malvern Small Volume Sample Dispersion Unit, DIF 2002 as the measuring unit. The following measurement conditions were selected: Compressed range; active beam length 2.4 mm; measurement range: 300 RF; 0.05 bis 900 μm. The sample preparation and measurement were carried out according to the producer specifications.

The $D_{90}$ value specifies the value at which 90% of the particles in the measured sample have a smaller or equal particle diameter. Correspondingly, the $D_{50}$ value and the $D_{10}$ value specify the value at which 50% or 10%, respectively, of the particles in the measured sample have a smaller or equal particle diameter.

According to one particularly preferred embodiment according to the invention, the values mentioned in the preceding description apply for the $D_{10}$ values, $D_{50}$ values, the $D_{90}$ values and the difference of the $D_{90}$ and the $D_{10}$ values in relation to the volume proportion of the respective particle in the total volume. Accordingly, the $D_{10}$, $D_{50}$, and $D_{90}$ values mentioned here according to this embodiment according to the invention specified the values at which 10 vol. % or 50 vol. % or 90 vol. % of the particles in the measured sample have a smaller or equal particle diameter. If these values are maintained, particularly advantageous materials are provided according to the invention and negative influences of relatively coarse particles (having comparatively larger volume component) on the processing ability and the electrochemical product properties are avoided. The values mentioned in the present description for the $D_{10}$ values, the $D_{50}$ values, the $D_{90}$ values and the difference of the $D_{90}$ and the $D_{10}$ values particularly preferably apply both with respect to percent and also volume-percent of the particles.

In the case of compositions (for example electrode materials) which contain further components in addition to the silicon carbide according to the invention, in particular in the case of carbonaceous compositions, the above light scattering method can lead to misleading results, since the silicon carbide particles can be bonded to form larger agglomerates by the additional (for example carbonaceous) material. The particle size distribution of the material according to the invention in such compositions can be determined, however, on the basis of SEM recordings as follows: A small quantity of the powder sample is suspended in acetone and dispersed for 10 minutes using ultrasound Immediately thereafter, several drops of the suspension are dripped on a sample plate of a scanning electron microscope (SEM). The solid concentration of the sample and the number of the drops are dimensioned so that a substantially single-ply layer made up of powder particles forms on the carrier to prevent mutual concealment of the powder particles. The dripping has to take place rapidly before the particles can separate according to size by sedimentation. After drying in air, the sample is transferred into the measurement chamber of the SEM. In the present example, it is a device of the type LEO 1530, which is operated using a field emission electrode at 1.5 kV excitation voltage and a sample distance of 4 mm. At least 20 randomly placed detail enlargements having an enlargement factor of 20,000 are recorded of the sample. These are each printed on a DIN A4 sheet together with the overlaid magnification scale. If possible, at least 10 freely visible particles of the material according to the invention, from which the powder particles are constructed, are randomly selected on each of the at least 20 sheets, wherein the boundaries of the particles of the material according to the invention are defined by the absence of fixed, direct adhesion bridges. In contrast, bridges due to possibly present carbon material are included in the particle boundary. The longest and shortest axis in the projection are each measured using a ruler for each of the selected particles and converted to the real particle dimensions on the basis of the scale ratio. For each measured SiC particle, the arithmetic mean value of the longest and the shortest axis is defined as the particle diameter. Subsequently, the measured SiC particles are classified into size classes similarly to the light scattering measurement. If one plots the number of the respective associated particles over the size class, a differential particle size distribution with respect to the number of particles is obtained. If the particle numbers are summed progressively from the small to the large particle classes, the cumulative particle size distribution is obtained, from which $D_{10}$, $D_{50}$, and $D_{90}$ can be read directly on the size axis.

The described method is also applied to battery electrodes containing the material according to the invention. In this case, however, instead of a powder sample, a fresh cut surface or fracture surface of the electrode is fastened on the sample carrier and studied in SEM.

EXEMPLARY EMBODIMENTS

The SiC according to the invention was produced by means of a modified sol-gel method as was similarly described in broad strokes, for example, by Yajima et al. Chem. Lett. 1975, 931 or by B. Friedel, Dissertation Paderborn, 2007, B. Kettner et al. In Adv. Eng. Mater. 2018, 1701067.

Example 1

Production of Nanoparticulate Silicon Carbide (3C-SiC)
1.1 Production of the Sol-Gel Si—C Precursor:

135 g tetraethyl orthosilicate (TEOS) was dissolved in 170 ml ethanol. Furthermore, a solution of 60 g sucrose was produced at 60° C. in 75 mL distilled water, to which 37.15 ml HCl (1M) was added drop by drop as a catalyst to form invert sugar. Subsequently, both solutions were mixed with one another with stirring and permitted to cool. A ratio of 1/6.5/0.3/0.06 has proven to be advantageous for the molar ratios TEOS/water/sucrose/HCl used. Variations of these ratios (individual or all) in the range of +/−10% are also usable in the scope of the present invention without changes occurring in the final product. Alternatively, instead of the sucrose solution, liquid sugar (invert sugar, 122 g 70%) can be used directly. Water is then not added and only very little HCl (5.2 mL 1M), since it is only still required to start the gelling process.

The resulting sol was dried for 48 hours and 60° C. and subsequently for 24 hours at 100-160° C., preferably at 150° C. The dry black coarse-grained granulate thus obtained ("Xerogel") was subsequently sintered under argon at 1100° C. over 15 hours and optionally ground. The molar ratio of C/Si in the granulate was 3.6. This ratio is particularly preferred, however, pure-phase 3C-SiC according to the invention is also obtained in a range of 3.2 to 4.0 C/Si. Outside this range, various foreign phases are found in the final product, such as molten $SiO_2$ and carbon residues and other SiC. Graphene residues can also form on the surface of the material according to the invention. Kettner et al. (op. cit.) uses different quantities of starting materials in relation to the method described here and also modified reaction conditions, whereby mixed phases are obtained (op. cit. chapter 3.1 and 3.2).
1.2. Production of SiC from the Precursor Subsequently, the granulate was sintered at 1800° C. for 5 hours, wherein the heating rate from 1000° C. to 1800° C. took place at a temperature gradient of 100° C./min. It was subsequently cooled to room temperature (25° C.) within 30 minutes. The particle size of the nanoparticulate pure-phase and stoichiometric 3C-SiC thus obtained was 40-100 nm, with a $D_{90}$ value of 63 nm (+/−1 nm) for the primary particles and 1-10 μm for the secondary particles with a $D_{90}$ value of 8 μm. The size of the primary particles may advantageously be controlled via the heating speed (heating rate) and the duration of the temperature treatment at 1800° C. Particularly large primary crystallites between 80 and 100 μm in size are obtained upon slower heating of the granulate, for example, at 10° C./minute and 8 hours sintering. It has fundamentally been found that with a faster heating rate and shorter duration of the temperature treatment at 1800° C., smaller primary crystallites are obtained.

Example 2

Production of Doped Nanoparticulate Silicon Carbide (3C-SiC)

The production runs similarly to that of the non-doped SiC. However, before the addition of the sucrose, the corresponding compound(s) of the dopant element(s) or the pure element(s) are put into the water heated to 60° C. Otherwise, the method is as in example 1. The sols thus obtained are partially colored depending on the dopant element/compound.

The amount of dopant compound/element was 5% in relation to 1M Si in each case.

The doped SiC thus obtained was studied in each case by means of EPR (electron paramagnetic resonance) spectroscopy and XRD.

In the present case, the following doped 3C-SiC nanoparticles were obtained: 2.1. 3C-SiC:Al by adding aluminum acetyl acetonate (5 at % Al in relation to Si) or elementary aluminum, dark blue 3C-SiC:Al was obtained.

An SEM recording of 3C-SiC:Al is shown in FIG. 1. The primary particles (primary crystallites) and the agglomerates consisting of them are clearly recognizable.

FIG. 2 shows an EDX recording of the 3C-SiC:Al according to the invention; the reflections for Si and Al are clearly recognizable.

2.2 3C-SiC:P (5 at % P in relation to Si) by addition of potassium dihydrogen phosphate 2.3 3C-SiC—N (5 at % Al in relation to Si) by addition of nitric acid, dark blue 3C-SiC:N was obtained.

An SEM recording of 3C-SiC:N shown in FIG. 3. The primary particles (primary crystallites) and the agglomerates consisting of them are clearly recognizable.

2.4.3C-SiC-B by addition of boron acetyl acetonate 2.5 3C-SiC-Er by addition of erbium acetyl acetonate

Example 3

Thin-film electrodes having 3C-SiC:Al and 3C-SiC:N as the active material were produced, as described, for example, in Anderson et al., Electrochem. and Solid State Letters 3 (2) 2000, pages 66-68. The electrode compositions typically consisted of 50 weight-parts active material, 30 weight-parts super P carbon, and 20% polyvinylidene fluoride (Solvay 21216) as the binder. A suspension was produced therefrom in N-methyl-2-pyrrolidone. The solid content of the slurry was 11.5%.

The electrode suspension was dispensed using a doctor blade (squeegee) at a height of approximately 200 μm and the N-methyl pyrrolidone was evaporated at 105° C. under vacuum. The dried electrodes were rolled multiple times or compressed using suitable pressure until a thickness of 20 to 25 μm was obtained. Subsequently, the electrodes were cut out (13 mm diameter) and compressed in an IR press at a pressure of 5 tons (3.9 tons/cm$^2$) over 20 seconds at room temperature. The electrodes were then dried overnight at 120° C. under vacuum and installed in an argon-filled glovebox in half cells against lithium metal and measured electrochemically. The electrode charge was 0.7 mg/cm$^2$ for SiC:N and 4.6 mg/cm$^2$ for SiC:Al.

The electrochemical measurements were carried out against lithium metal (counter and reference electrodes made of lithium) and using LP30 (Merck, Darmstadt) as the electrolyte (EC (ethylene carbonate):DMC (dimethyl carbonate)=1:1, 1 M LiPF$_6$). The test method was carried out in the CC mode, i.e., cycles with a constant current at the C/100 rate between the voltage limits 0.05 V and 2.0 V against Li/Li$^+$ In the electrodes having 3C-SiC:Al as the active material, a reversible capacitance between 400 and 500 mAh/g was obtained. Upon delithiation, a so-called plateau was observed at 0.4 V vs. Li (FIG. 4). The electrode contained 2.6 mg 3C-SiC:Al as active material. The total measuring time was 190 hours.

2 cycles were measured:

The invention claimed is:

1. A nanoparticulate silicon carbide SiC in the form of secondary particles, which consist of agglomerates of SiC primary particles, wherein the primary particles have an average particle size in the range of 30-100 nm and the secondary particles have an average particle size of 1-10 μm, and wherein a D90 value of the secondary particles is in the range of 8-10 μm, and wherein the SiC is present in a crystal structure comprising at least two of 6H-SiC, 4H-SiC and 15R-SiC as a mixture.

2. The nanoparticulate silicon carbide SiC as claimed in claim 1, wherein the agglomerates have a bulk density of 1200-1600 g/l.

3. The nanoparticulate silicon carbide SiC as claimed in claim 1, wherein the agglomerates have a compressed density of 1500-3000 g/l (1.5-3 g/cm$^3$).

4. The nanoparticulate silicon carbide SiC as claimed in claim 1, a powder resistance of which is <28 Ω*cm.

5. The nanoparticulate silicon carbide SiC as claimed in claim 1, wherein the SiC is doped using an element selected from us Mg, Nb, Zr, B, Cr, V, Sc, Y, Al, N, P, La, Er, and Ga and mixtures thereof.

6. The nanoparticulate silicon carbide SiC as claimed in claim 5, wherein the element is B and/or Al or N and/or P.

7. The nanoparticulate silicon carbide SiC as claimed in claim 1, wherein the SiC is present in the 3C crystal structure.

8. A use of a nanoparticulate silicon carbide as claimed in claim 1 as an electrode for a secondary lithium-ion battery.

9. An electrode for a secondary lithium-ion battery containing a silicon carbide as the active material as claimed in claim 1.

10. The electrode as claimed in claim 9, wherein the density of the active material of the electrode is 1.53 g/cm$^3$.

11. The electrode as claimed in claim 9, wherein the electrode is an anode.

12. The electrode as claimed in claim 11, wherein the SiC is doped using N or Al.

13. The electrode as claimed in claim 12, wherein the electrode doped using Al has a plateau at 0.4 V+/−0.05 V vs. Li.

14. A secondary lithium-ion battery comprising an anode as claimed in claim 12.

15. The electrode as claimed in claim 10, wherein the electrode is an anode.

16. A secondary lithium-ion battery comprising an anode as claimed in claim 13.

17. The nanoparticulate silicon carbide SiC as claimed in claim 1, wherein the SiC is present in a crystal structure comprising 6H-SiC and 4H-SiC as a mixture.

| Cycle | Lithiation Capacitance/mAh | Delithiation Capacitance/mAh | Lithiation Capacitance/mAh/ g(SiC.Al) | Delithiation Capacitance/mAh/ g(SiC.Al) | Efficiency/% |
|---|---|---|---|---|---|
| 1 | 1.920 | 1.020 | 738 | 392 | 53 |
| 2 | 1.208 | 0.897 | 464 | 345 | 74 |
| 3 | 0.994 | 0.788 | 382 | 303 | 79 |
| 4 | 0.844 | 0.709 | 324 | 273 | 84 |
| 5 | 0.753 | 0.657 | 289 | 253 | 87 |

18. The nanoparticulate silicon carbide SiC as claimed in claim 1, wherein the SiC is present in a crystal structure comprising 6H-SiC, 4H-SiC and 15R-SiC as a mixture.

\* \* \* \* \*